United States Patent [19]
Gibbs

[11] Patent Number: 5,891,551
[45] Date of Patent: Apr. 6, 1999

[54] APPARATUS FOR REDUCING DRAG ACROSS A FLOW SURFACE

[76] Inventor: Ronnie D. Gibbs, 3176 S. 44 East, Bountiful, Utah 84010

[21] Appl. No.: 892,363

[22] Filed: Jul. 14, 1997

[51] Int. Cl.[6] .................... B32B 3/00; B63B 1/32; B64C 1/38
[52] U.S. Cl. ............... 428/156; 428/167; 428/188; 114/288; 244/130
[58] Field of Search ................. 428/167, 156, 428/188, 212, 213, 343; 244/130; 114/288, 290

[56] References Cited

U.S. PATENT DOCUMENTS

| | | | |
|---|---|---|---|
| 3,055,022 | 9/1962 | Valiquist | 9/1 |
| 3,220,026 | 11/1965 | Lichti | 9/1 |
| 3,374,495 | 3/1968 | Joyce | 9/310 |
| 4,751,891 | 6/1988 | Wilson | 114/219 |
| 4,762,080 | 8/1988 | Pearson | 114/219 |
| 4,865,271 | 9/1989 | Savill | 244/130 |
| 4,909,172 | 3/1990 | Hamby | 114/219 |
| 4,986,496 | 1/1991 | Marentic et al. | 244/130 |
| 5,485,801 | 1/1996 | Gibbs | 114/219 |

FOREIGN PATENT DOCUMENTS

| | | | |
|---|---|---|---|
| 0031640 | 3/1980 | Japan | 114/219 |
| 139369 | 6/1993 | Japan | 114/67 R |

*Primary Examiner*—Donald Loney
*Attorney, Agent, or Firm*—Madson & Metcalf

[57] ABSTRACT

An apparatus for reducing drag over a flow surface and methods for using same is disclosed in one presently preferred embodiment as including a drag reduction member comprising a means for reducing drag over a surface facing of a substrate (e.g., watercraft, airplane, automobile, airfoil, rudder, or the like) moving through a fluid (e.g., liquid or gas) parallel and opposite to the direction of motion. The drag reduction member includes an exterior surface, an opposing contacting surface adapted to selectively cover at least a portion of the surface facing of the substrate, and an opening integrally formed in the body of the drag reduction member to enhance flexibility upon installation and provide greater resistance to impact forces. The opening may be sealable by means of at least two extension wings engageably disposed in relation thereto. The means for reducing drag over at least a portion of the flow surface of the substrate comprises at least two elongated channels or at least two complimentary pairs of elongated channels formed in the exterior surface of the drag reduction member, wherein each of the elongated channels or pairs of elongated channels are formed having an angular configuration selectively diverse dimensionally from the angular configuration of each of the other elongated channels or pairs of elongated channels of the drag reduction member.

23 Claims, 5 Drawing Sheets

APPARATUS FOR REDUCING DRAG ACROSS A FLOW SURFACE

BACKGROUND

1. The Field of the Invention

This invention relates to drag reduction devices and, more particularly, to novel apparatus for reducing drag over a flow surface and methods for using same.

2. The Background Art

It has long been desirable to reduce the resistance force which acts against a body (e.g., airplane, watercraft, automobile, airfoil, or the like) moving through a fluid (e.g., liquid or gas) parallel and opposite to the direction of motion. Correspondingly, drag reduction apparatus and methods have been developed by those skilled in the art to assist in reducing the drag coefficient which acts against a moving body.

For example, those skilled in the art developed drag reduction articles comprising a conformable sheet material having a first surface including a series of parallel peaks separated from one another by a series of parallel valleys, whereas all of the peaks are dimensionally identical to each other as are all of the valleys. In addition, an earlier patent of the present inventor, U.S. Pat. No. 5,485,801, is directed to a mechanically altering flow control surface which is capable of improving the hydrodynamic flow of water across the exterior surface of a watercraft while further providing a means for shielding the keel and/or bow of the watercraft from abrasive damage.

Watercraft such as, for example, motorboats, jet skis, wave runners, yachts, sailboats, kayaks and canoes are generally formed of a fiberglass composite material which can become easily damaged or seriously scratched as a result of forcible impact or collision with sand, gravel, rocks or other obscure objects or debris found in water. Typically, when a watercraft is beached, removed from and/or launched into water, or while the watercraft is merely moving through the water, the lowermost portion of the hull of the watercraft (generally encompassing portions of the stem, bow, forefoot, keel and stern) is particularly susceptible to abrasion. Consequently, abrasive damage usually promotes corrosion and structural weakening of the hull of the watercraft. In addition, the bow of a watercraft may procure serious damage as a result of forcible contact with the docking platform where the watercraft is secured.

Traditionally, the keel and bow (inclusive of the stem and forefoot) of a watercraft are generally formed having a substantially arcuate shape which structurally encourages the hydrodynamic flow of water across the exterior surface of the hull as the watercraft moves through water. The hydrodynamic performance of a watercraft, however, can be sufficiently reduced as a result of abrasions on the keel and/or bow of the watercraft. In this regard, serious damage such as, for example, deep scratches, penetration, or abrasions in the exterior surface of the hull of a watercraft, may generate substantial dragging or suction forces which generally act against the motion of the immersed watercraft and, more importantly, may significantly affect the overall hydrodynamic performance of the watercraft in water. Moreover, abrasions in the hull of a watercraft, particularly formed of fiberglass, will generally necessitate the repair and/or replacement of the hull and those structural features of the body of the watercraft functionally affected.

The repair and/or replacement of the hull of a watercraft is customarily costly, and typically sorely inconvenient to the owner. Accordingly, the capacity for protecting the keel and/or bow of a watercraft from abrasive wear and tear, damage, and/or deep scratching has encouraged significant concentration and development within the marine industry as to the various options available for protecting the hull of a watercraft and reducing the cost of repair and maintenance of the exterior surface thereof, while substantially preserving the inherent monetary value of the watercraft itself.

In an attempt to structurally accommodate the ability to protect at least a portion of the lowermost portion of a watercraft from structural damage caused by abrasion and deep scratching, those skilled in the art developed prior art bow protectors. A serious disadvantage associated with bow protectors of the prior art, however, is their general inability to adequately conform over the keel or bow of the particularly engineered keel or bow configuration or design of a specific make or model of watercraft.

Prior art bow protectors are traditionally designed and manufactured as a preformed unit having a substantially rigid "V" shaped configuration. The material comprising prior art bow protectors is usually only slightly deformable or conformable when disposed over the particular configuration of the bow or keel of a watercraft. In this regard, since the design and configuration of the hull of a watercraft is not universal in relation to other watercraft, prior art bow protectors are typically unable to provide sufficient universal conformity over the keel and/or bow of watercraft having various sizes, shapes, and/or configurations.

Similarly, because the manufacturing of prior art bow protectors in various sizes and shapes for conformity in relation to different makes and models of watercraft can be economically impractical, bow protectors of the prior art are typically molded or preformed in several conventional sizes and shapes in an attempt to provide an approximate conformity over the dimensional size and configuration of the keel and/or bow of the various watercrafts.

Other practical disadvantages with bow protectors of the prior art have also emerged in relation to the installation of bow protectors over the keel and/or bow of the watercraft. For example, in order to properly install prior art bow protectors over a nonconforming keel and/or bow of a watercraft, at least two skilled installers are typically required who generally apply compression forces against the preformed body of the prior art bottom protector in order to bend and slightly alter the shape of the bow protector to minimally conform over the keel and/or bow of the watercraft. In this regard, prior art bow protectors are generally installed by two or more skilled technicians having received special training in the installation process and utilizing the necessary tools to minimize the plurality of problems which may arise during the installation process.

Similarly, there are significant disadvantages associated with the reduction of the overall hydrodynamic performance of a watercraft as a result of installation of nonconforming prior art bow protectors over the keel and/or bow of the watercraft. For example, several bow protectors of the prior art are generally formed having a substantially empty chamber (e.g., defined by an epoxy adhesive and spacer blocks) formed between the keel and/or bow of the watercraft and the internal surface of the prior art bow protector. This empty chamber essentially modifies the distinctively engineered configuration or design of the original keel and/or bow of the watercraft, thus producing meaningful resistive forces or drag coefficient. In particular, the modification of the designed shape, conformation, and/or configuration of the keel and/or bow of a watercraft may seriously affect the overall efficiency of the hydrodynamic flow of water across the exterior surface of the watercraft.

In addition to the foregoing disadvantages, prior art bow protectors typically promote hydrodynamic dragging or resistance as a result of suction forces acting against the exterior surface of the keel and/or bow of the watercraft. Since boat protectors may be secured to the exterior surface of the watercraft by means of an epoxy adhesive and spacer blocks to form a hollow chamber, when prior art bow protectors are not substantially conformed over the configuration of the keel and/or bow of the watercraft, the force of the water resistance acting against the keel and/or bow of the watercraft as it moves through the water typically overwhelms the means for securing the bow protector in relation to the keel and/or bow of the watercraft. In this regard, prior art bow protectors usually become detached from the exterior surface of the watercraft and, correspondingly, have a direct effect on seriously reducing or inhibiting the expected hydrodynamic performance of the watercraft.

Furthermore, bow protectors of the prior art may be formed of a clear plastic material comprising a molecular composition which can be sufficiently degraded as a result of persistent contact with ultraviolet light. As appreciated by those skilled in the art, ultraviolet light typically breaks down or alters the chemical structure of these types of clear plastic materials which generally results in the discoloration of the plastic so as to display a slightly yellowish tint. Moreover, long exposure to ultraviolet light may cause the clear plastic of prior art bow protectors to separate from the exterior surface of the watercraft as a result of a chemical breakdown of the characteristics of the adhesive applied to the backing of prior art bow protectors for the purpose of securing the cover member to the keel and/or bow of the watercraft.

BRIEF SUMMARY AND OBJECTS OF THE INVENTION

In view of the foregoing, it is a primary object of the present invention to provide novel apparatus for reducing drag over a flow surface of a substrate and methods for using same.

It is also an object of the present invention to provide an apparatus for reducing drag over a flow surface of a substrate having at least two elongated channels formed in the exterior surface of the drag reduction member, wherein a first elongated channel may be formed having an angular dimension selectively diverse from a second elongated channel.

It is a further object of the present invention to provide an apparatus for reducing drag over a flow surface comprising a drag reduction member being conformable so as to provide universal application over various designs and/or configurations of a substrate or moving body, such as, for example, an airplane wing, automobile, airfoil, or the like and, more particularly, the keel and/or bow of a watercraft.

It is a still further object of the present invention to provide an apparatus for reducing drag over a flow surface of a substrate which comprises a drag reduction member formed of a material capable of providing sufficient rigidity so as to withstand abrasive damage to the portion of the surface facing of the substrate covered by the drag reduction member and, more particularly, to protect the keel and/or bow of a watercraft from abrasive damage caused by sand, gravel, rocks and other obscure objects or debris found in water.

Moreover, it is an object of the present invention to provide an apparatus for reducing drag over a flow surface of a substrate which comprises a sealable elongated channel which provides a means for cushioning impact forces and enhances flexibility upon application of the drag reduction member over at least a portion of the surface facing of a substrate.

In addition, it is an object of the present invention to provide an apparatus for reducing drag over a flow surface of a substrate which comprises a protective lip having a dimensional thickness and rigidity sufficient to provide a means for protecting a securing means from contact with fluid (air, water, oil, lubricants, hydraulic fluids, sand, gravel, rocks, and/or other objects or debris) which may reduce the securing properties of the securing means.

It is an additional object of the present invention to provide an apparatus for reducing drag over a flow surface which does not require two or more technicians having special knowledge, skills, and/or tools to properly install the present invention over at least a portion of a surface facing of a substrate or moving body, such as, for example, an airplane wing, automobile, airfoil, or the like and, more particularly, the keel and/or bow of a watercraft.

It is likewise an object of the present invention to provide an apparatus for reducing drag over a flow surface of a substrate which is capable of reducing the cost of repair and maintenance of the substrate.

Consistent with the foregoing objects, and in accordance with the invention as embodied and broadly described herein, an apparatus for reducing drag over a flow surface is disclosed in one presently preferred embodiment of the present invention as including a drag reduction member comprising a means for reducing drag over a surface facing of a body or substrate moving through a fluid (e.g., liquid or gas) parallel and opposite to the direction of motion. As used herein, the substrate may include, but is not limited to, a watercraft, airplane, automobile, airfoil, or the like. The drag reduction member includes an exterior surface and an opposing contacting surface adapted to selectively cover at least a portion of the surface facing of the substrate. The means for reducing drag over at least a portion of the flow surface of the substrate includes at least two elongated channels or complimentary pairs of elongated channels formed in the exterior surface of the drag reduction member, wherein each of the elongated channels or complimentary pairs of elongated channels are formed having an angular configuration selectively diverse dimensionally from the angular configuration of the other elongated channel(s) or pair(s) of elongated channels formed in the drag reduction member.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 7, is not intended to limit the scope of the invention, as claimed, but it is merely representative of the presently preferred embodiments of the invention.

The presently preferred embodiments of the invention will be best understood by reference to the drawings, wherein like parts are designated by like numerals throughout.

Figure 1:
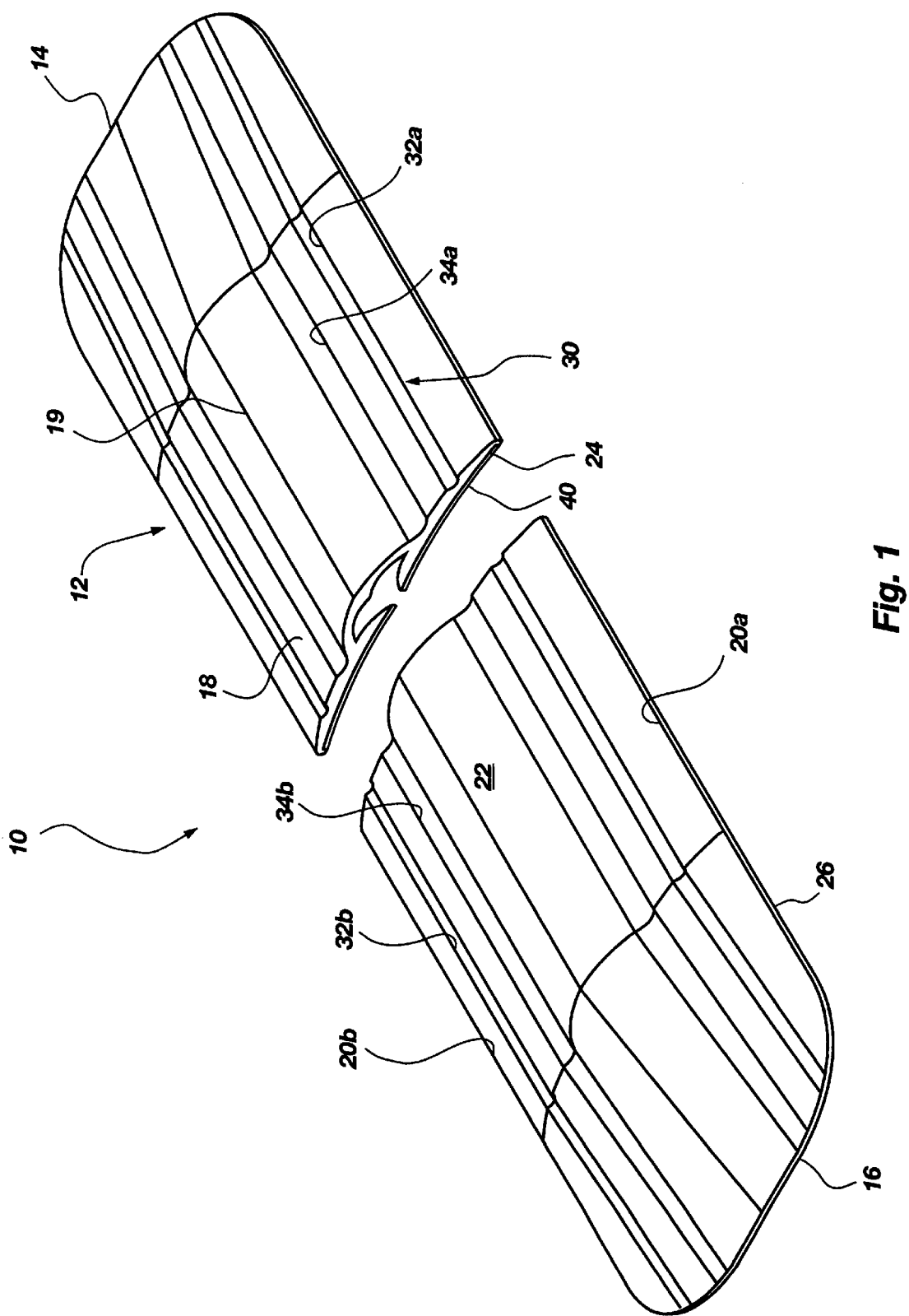
FIG. 1 is a perspective view of an apparatus for reducing drag over a flow surface of a substrate in accordance with one presently preferred embodiment of the present invention.
Figure 6:
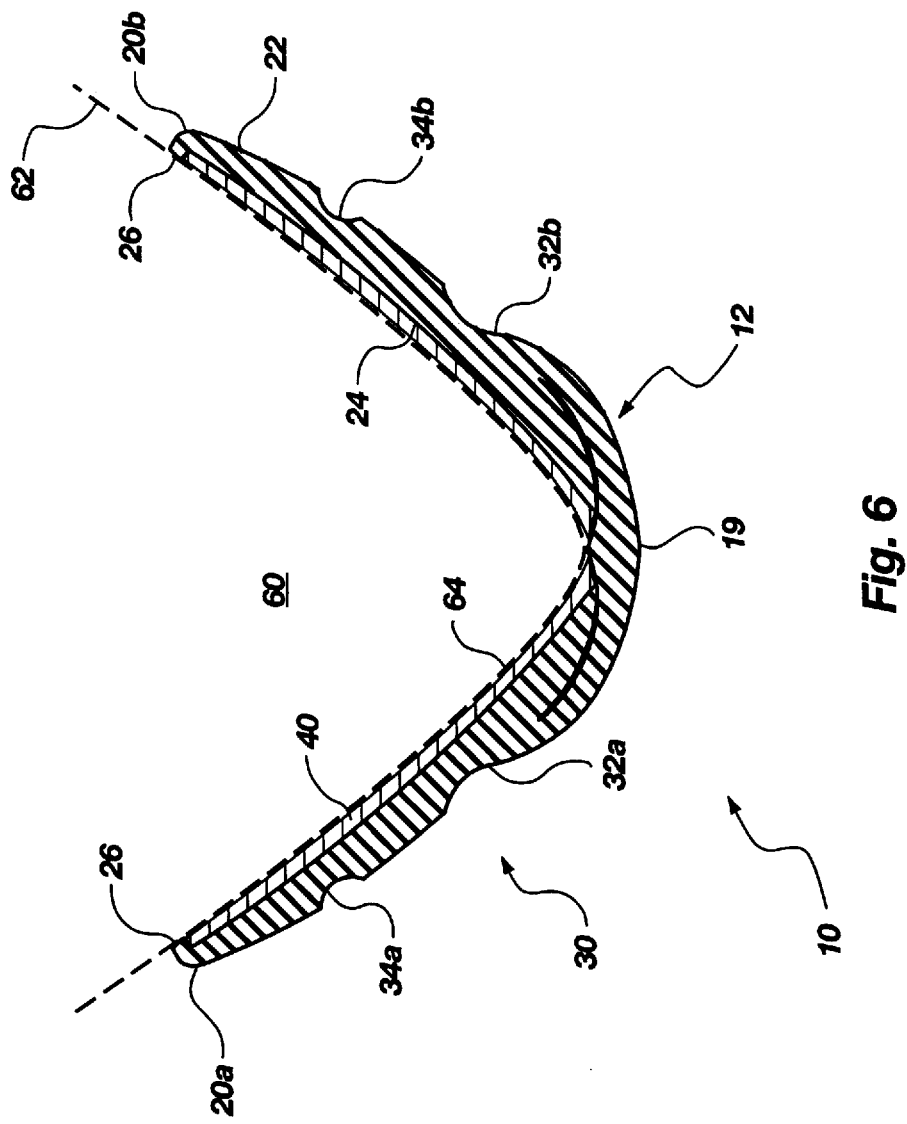
FIG. 6 is a cross-sectional view of one presently preferred embodiment of the apparatus for reducing drag over a fluid surface which illustrates one presently preferred embodiment of a drag reduction member disposed in contact with the keel and/or bow of a watercraft.

One presently preferred embodiment of the present invention, designated generally at 10, is best illustrated in FIGS. 1 and 6. As shown, an apparatus for reducing drag over a flow surface 10 includes a drag reduction member 12 comprising a means for reducing drag 30 of a fluid (e.g., liquid or gas) flowing over a surface facing 62 of a substrate 60. The drag reduction member 12 comprises an exterior surface 22 and an opposing contacting surface 24 adapted to selectively cover at least a portion 64 of the surface facing 62 of the substrate 60. The means for reducing drag 30 of a fluid over the covered portion 64 of the surface facing 62 of the substrate 60 includes at least two elongated channels 32, 34 or complimentary pairs of elongated channels 32a, 32b, 34a, 34b formed in the exterior surface of the drag reduction member 12. Structurally, the first elongated channel 32 or complimentary pair of elongated channels 32a, 32b is formed having an angular configuration selectively diverse dimensionally from the angular configuration of a second elongated channel 34 or pair of elongated channels 34a, 34b formed in the exterior surface 22 of the drag reduction member 12. The first and second elongated channels 32, 34 or complimentary pairs of elongated channels 32a, 32b, 34a, 34b are preferably disposed substantially parallel to the linear length of the drag reduction member 12.

Figure 2:
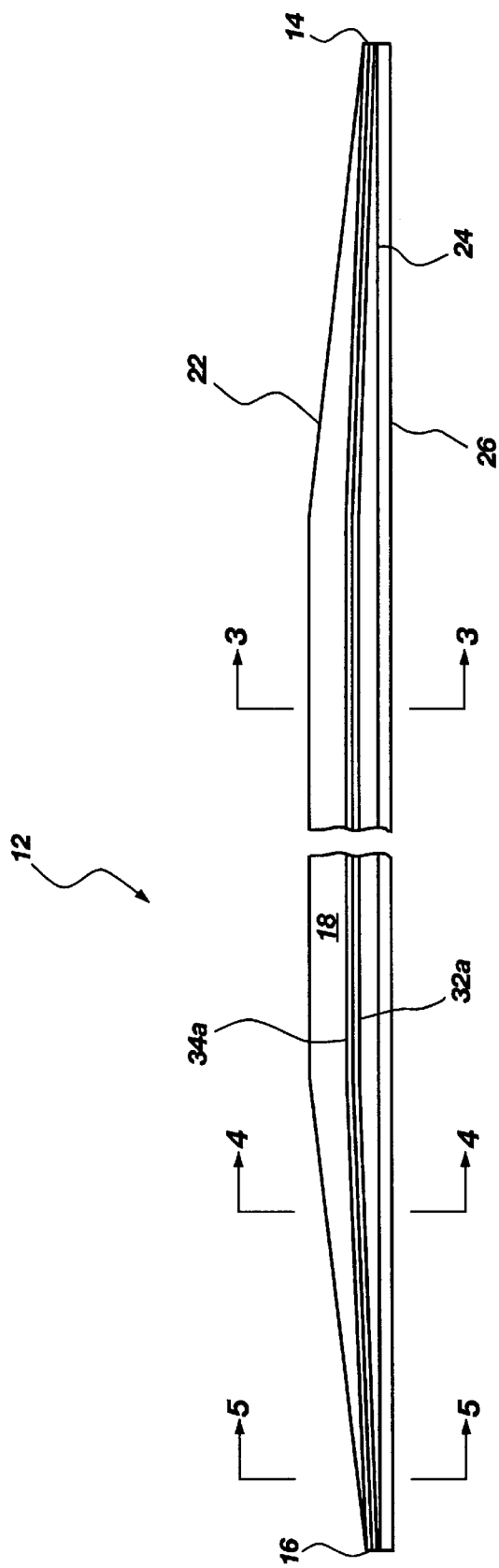
FIG. 2 is a side-elevational view of one presently preferred embodiment of the apparatus for reducing drag over a flow surface of a substrate as illustrated in FIG. 1.

The drag reduction member 12 preferably comprises a first end 14, a second opposing end 16, and an intermediate body portion 18 disposed therebetween. In one presently preferred embodiment of the present invention, the intermediate body portion 18 of the drag reduction member 12 may be formed comprising an elongated body having a general cross-sectional thickness at a midsection 19 that begins to taper in width contiguous the first and second ends 14, 16 of the drag reduction member 12. Similarly, the intermediate body portion of the drag reduction member 12 may be formed having a general cross-sectional thickness at the midsection 19 which begins to taper in width contiguous the opposing sides 20a, 20b of the elongated body, whereas the opposing sides 20a, 20b extend substantially transverse the first and second ends 14, 16 of the drag reduction member 12, as best illustrated in FIGS. 1 and 2.

For example, the midsection 19 of the intermediate body portion 18 may be formed having a cross-sectional thickness of approximately 1 cm and the opposing sides 20a, 20b having a cross-sectional thickness of approximately 0.5 cm. It will be readily appreciated by those skilled in the art that other variations in thickness, dimension, configuration and/or shape of the drag reduction member 12 are possible. In one presently preferred practice, the tapering cross-sectional thickness of the drag reduction member 12 in combination with the elongated channels 32a, 32b, 34a, 34b formed therein provide means for improving the hydrodynamic flow of water across at least a portion 64 of the surface facing 62 of a substrate 60, such as a watercraft, as it moves through water.

Figure 3:
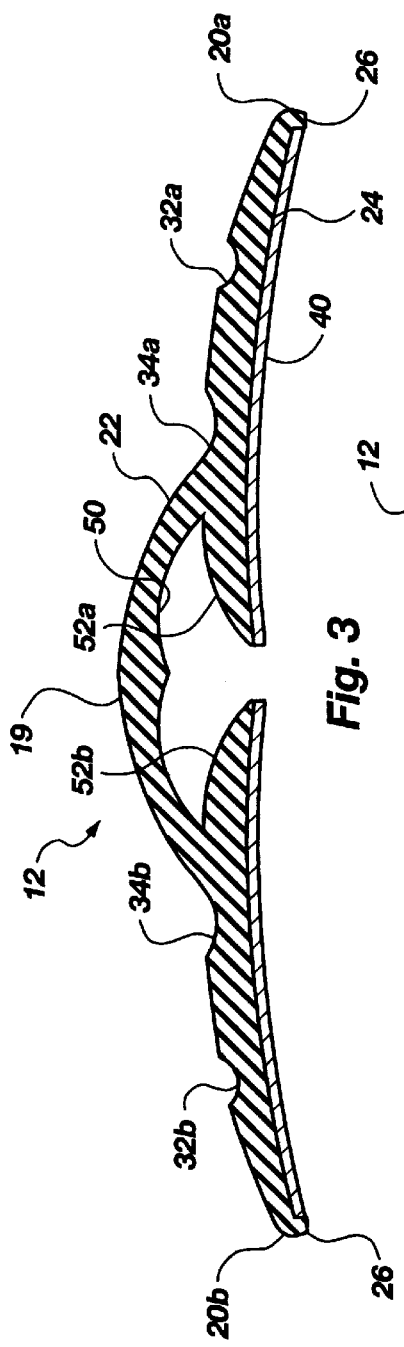
FIG. 3 is a cross-sectional view of the presently preferred embodiment of the apparatus for reducing drag over a flow surface of a substrate as shown in FIG. 2 taken along lines 3—3 of FIG. 2.
Figure 4:
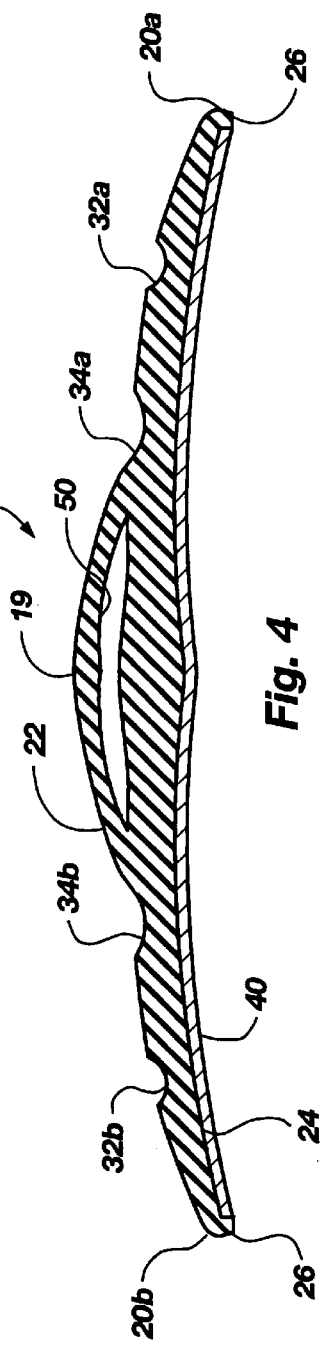
FIG. 4 is a cross-sectional view of the presently preferred embodiment of the apparatus for reducing drag over a flow surface of a substrate as illustrated in FIG. 2 taken along lines 4—4 of FIG. 2.
Figure 5:
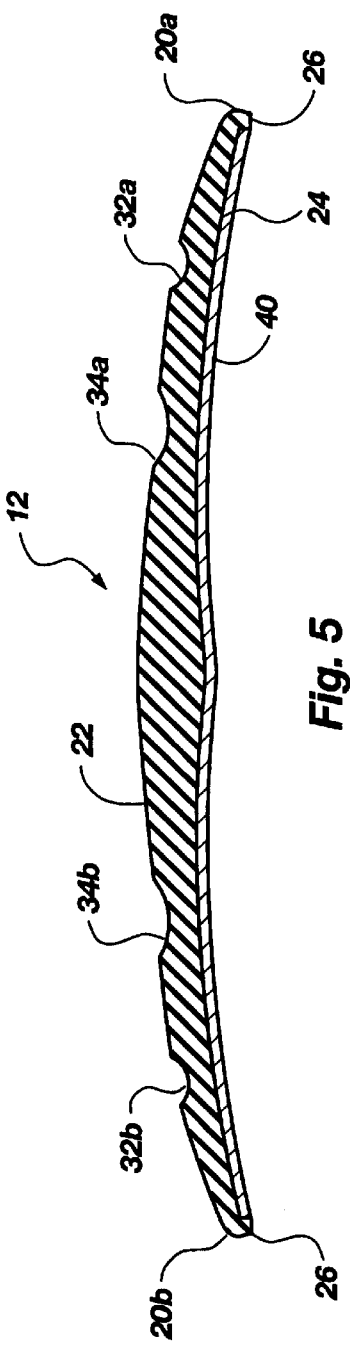
FIG. 5 is a cross-sectional view of the presently preferred embodiment of the apparatus for reducing drag over a flow surface of a substrate as shown in FIG. 2 taken along lines 5—5 of FIG. 2.

In one presently preferred embodiment of the present invention, an elongated opening 50 may be integrally formed in the body of the drag reduction member 12 to enhance flexibility upon installation and provide greater resistance to impact forces, as best shown in FIGS. 1 and 3. The elongated opening 50 may be dimensionally formed to approximate the linear disposition of the midsection 19 of the intermediate body portion 18 of the drag reduction member 12. Correspondingly, the opening 50 may be longitudinally disposed parallel to the flow of fluid (e.g., liquid or air) over the surface facing 62 of the substrate 60, as best illustrated in FIGS. 1, 3 and 4. As shown, the linear length of the elongated opening 50 generally corresponds to the linear length of the midsection 19 of the drag reduction member 12. Structurally, the opening 50 comprises an internal surface area which begins to taper dimensionally contiguous the first and second ends 14, 16 of the drag reduction member 12, as best shown by means of progressive tapering from FIG. 3 to FIG. 4 to FIG. 5 in reference to FIG. 2.

At least two extension wings 52a, 52b may be formed in closeable relation to the elongated opening 50, thus providing a means for being engageably disposed in relation to a corresponding portion of the internal surface area of the opening 50. Specifically, the extension wings 52a, 52b are preferably disposed in closeable relation to the opening 50 so as to secure an engagement which is conformable to the specific configuration and/or design of the portion 64 of the surface facing 62 of the substrate 60 (e.g., the keel and/or bow of a watercraft) to which the drag reduction member 12 may be applied, as illustrated by way of example in FIG. 6. To this end, each of the extension wings 52a, 52b are generally formed having a dimensional size and configuration sufficient for operably engaging the respective surface area of the elongated opening 50, thereby providing means for sealing the channel to prevent the entry of fluid (e.g., liquid, air, sand, debris, etc.) from entering the internal surface area of the elongated opening 50. Moreover, the elongated opening 50 in cooperation with at least two extension wings 52a, 52b provides a conformable drag reduction member 12 which conforms over a surface facing by means of multiple hinge connection points to insure a more secure fit.

Preferably disposed in relation to at least a portion of the periphery of the contacting surface 24 of the drag reduction member 12 is a means for securing 40 the drag reduction member 12 to at least a portion 64 of the surface facing 62 of a substrate 60. In one presently preferred embodiment of the present invention, the means for securing 40 may comprise a separate layer of adhesive, such as one or more strips of an adhesive tape, for example, an acrylic foam self-adhesive tape manufactured by Minnesota Mining and Manufacturing Company (3M), Part No. 4229P. It will be readily appreciated, however, that other suitable materials such as, for example, an adhesive (of or relating to epoxy resins, vinyl acetate resins, polyurethane resins, rubber-based adhesives, butyl tape, polysulfide elastomers, elastomeric styrene-butadiene copolymers, elastomeric butadiene homopolymers, polycarbonate polymers, or the like), nails, rivets, screws, bolts, tee-nuts, etc. are possible which are consistent with the spirit and scope of the present invention. Alternatively, the means for securing 40 the drag reduction member 12 to the substrate 60 may comprise an inherent adhesive which may be activated by solvents, temperature, pressure, or the like. As will be appreciated, whether the securing means 40 disposed in relation to at least a portion of the contacting surface 24 of the drag reduction member 12 is inherently adhesive or uses a separate adhesive, the characteristics of the adhesive are compatible with the substrate 60 to which it is applied and is preferably resistant to water, oil, lubricants, hydraulic fluids, and/or the like.

As best shown in FIGS. 1, 2, 3 and 6, a protective lip 26 may be preferably formed along the outer periphery of the contacting surface 24 of the drag reduction member 12. In preferred design, the protective lip 26 is preferably disposed along the opposing sides 20a, 20b and the first and second ends 14, 16 of the drag reduction member 12. The protective lip 26 is preferably formed having a dimensional thickness and rigidity which is sufficient to provide a means for protecting the securing means 40 from contact with water, oil, lubricants, hydraulic fluids, sand, gravel, rocks, and/or other objects or debris. It is apparent that other forms of the protective lip 26 or other mechanisms may be constructed in accordance with the inventive principles set forth herein. It is intended, therefore, that the example provided herein be viewed as exemplary of the principles of the present invention, and not as restrictive to a particular structure for implementing those principles.

Consistent with the foregoing, the linear length and the peripheral width of the drag reduction member 12 may vary in accordance with the dimensional size and configuration of the portion 64 of the surface facing 62 of the substrate 60 to which the drag reduction member 12 is to be applied. For example, in order to adequately cover the keel of a 26 ft (7.92 m) watercraft, a drag reduction member 12 having a linear length of approximately 9 ft (2.74 m) and a peripheral width of approximately 5 in (12.7 cm) may be utilized. Accordingly, it will be readily appreciated by those skilled in the art that since the drag reduction member 12 of the present invention must conform to the size of the portion 64 of the surface facing 62 of the substrate 60 to which it is to be applied, it is anticipated that the various structural elements thereof may be formed in a series of different sizes and/or dimensions so as to accommodate different sizes and/or configurations and sufficiently cover the portion 64 (e.g., keel and/or bow) of the surface facing 64 (e.g., hull) of a substrate 60 (e.g., watercraft). In this regard, those skilled in the art will readily recognize that various portions of the exterior surface 62 of the substrate 60 may be covered by the drag reduction member 12 of the present invention, either as a single member or as one or more independent sectional pieces.

Structurally, the drag reduction member 12 is preferably comprised of a material adapted to be conformable to at least a portion 64 of the surface facing 62 of a substrate 60. As used herein, the term "conformable" means that the drag reduction member 12 assumes the shape and/or configuration of the portion 64 of the surface facing 62 of the substrate 60 to which it is applied. In operation, the drag reduction member 12 will generally not detach from the substrate 60 even under extreme stress, such as elongation and/or compression, once the drag reduction member 12 has been attached to the portion 64 of the surface facing 62 of the substrate 60. For example, the drag reduction member 12 may conform to the flat, curvilinear, or arcuate configuration or design of the keel and/or bow of a watercraft, the skin of an airplane wing, the exterior of an automobile, airfoil, rudder, or the like.

The drag reduction member 12 may be comprised of a number of materials which may include, but is not intended to be limited to, polyolefins, polycarbonate elastomers, polyurethanes, vinyl polymers, styrene-butadiene thermoplastic elastomers, natural or synthetic rubber (e.g., polyurethane rubber, Nitrile rubber, etc.), cellulosic or polyamide films, Polycor™, Tivar™, or any of numerous organic, synthetic, or processed materials that are mostly thermoplastic or thermosetting polymers of high molecular weight with or without additives, such as, plasticizers, antioxidants, colorants, ultraviolet light stabilizers, or fillers, which can be molded, cast, extruded, drawn or laminated. As will be readily appreciated by those skilled in the art, other suitable materials are possible which are consistent with the spirit and scope of the present invention.

Additionally, the material comprising the drag reduction member 12 is preferably formed of a material being sufficiently sturdy to withstand stress or force without permanent or serious deformation. While the exact material comprising the drag reduction member 12 of the present invention is not critical to the present invention, it should be noted that specific materials will be better suited to some applications than others. For example, water-resistant materials will be better suited for use in a water environment than water-sensitive materials. Similarly, thermoset flexible materials will be better suited than thermoplastic materials in those situations where elevated temperatures may be encountered.

In one presently preferred embodiment of the present invention, the drag reduction member 12 may be formed of a material having the capability of becoming sufficiently flexible or malleable when directly exposed to elevated temperatures (e.g., heat) and, more importantly, having the further capability of becoming substantially rigid and non-resilient under conditions of exposure to low to moderate temperatures. For example, the material comprising one presently preferred embodiment of drag reduction member 12 provides a means for conforming the elongated body of the drag reduction member 12 for installation over at least a portion 64 of the surface facing 62 of a substrate 60, such as, for example, the keel and/or bow of watercraft by means of applying elevated temperatures directly to the body of the drag reduction member 12. Conversely, the drag reduction member 12 generally becomes substantially rigid and non-resilient in its conformable disposition over the portion 64 of the surface facing 62 of the substrate 60 when exposed to low to moderate temperatures so as to provide a means for withstanding abrasive damage which may be caused by forcible contact with sand, gravel, rocks, and/or other obscure objects or debris found in water.

If desired, the drag reduction member 12 may also be formed in a variety of colors corresponding to the particular underlying color of the substrate 60, such as, for example, the keel and/or bow of a watercraft. The colors may include, but are not limited to, white, black, grey, brown, sand, red, green, blue, yellow, etc. The variations in color of the drag reduction member 12 typically blend with and/or enhances the aesthetic appearance of the substrate 60. Additionally, the colorant used to color the drag reduction member 12 may include a means for protecting the adhesive characteristics of the securing means 40 from potential molecular and chemical degradation that may be caused by a reaction between the adhesive characteristics of the securing means 40 and radiation or ultraviolet light. In the alternative, the drag reduction member 12 may be formed of a clear or translucent material providing means for protecting the adhesive characteristics of the securing means 40 while being consistent with the spirit and scope of the present invention.

In one presently preferred embodiment of the apparatus for reducing drag over a flow surface 10 of the present invention, a means for reducing drag 30 is provided which comprises two or more elongated channels 32, 34 integrally formed in the exterior surface 22 of the drag reduction member 12, as best illustrated in FIGS. 1, 3, 4 and 5. Disposed parallel to the flow of fluid (e.g., liquid or gas) across the exterior surface 22 of the drag reduction member 12, the elongated channels 32, 34 preferably extend between the first and second ends 14, 16 of the drag reduction member 12. Moreover, the means for reducing drag 30 generally provides substantial flexibility to the body of the drag reduction member 12 upon application over at least a portion 64 of the surface facing 62 of a substrate 60, such as, for example, the keel and/or bow of a watercraft.

In current design, as least two complimentary pairs of elongated channels 32a, 32b, 34a, 34b are longitudinally disposed substantially outward and parallel to the linear disposition of the midsection 19 at approximately the same distance on opposing sides thereof. As shown, the elongated channels 32a, 32b, 34a, 34b may be configured having a substantially "U" or "V" shaped configuration. As will be readily appreciated by those skilled in the art, other geometrical shapes and/or configurations of the elongated channels 32, 34 are possible and, therefore, intended to be contemplated herein.

In one presently preferred application of the present invention, the pairs of complimentary elongated channels 32a, 32b, 34a, 34b may be configured in such a manner so as to provide conduits or pockets of air within a body of water between the exterior surface 22 of the drag reduction member 12. Accordingly, the pockets or conduits of air substantially defined by the particular angular dimensions of the elongated channels 32, 34 provide a means for generally improving the hydrodynamic flow of water across the surface facing 62 of the substrate 60 as it moves through a body of water.

Referring now specifically to FIGS. 3, 4, 5, and 6, a first pair of elongated channels 32a, 32b may be formed at a distance of between approximately 0.2 cm and 2.0 cm from the midsection 19 of the drag reduction member 12 and on opposing sides 20a, 20b thereof. The first pair of elongated channels 32a, 32b may be formed having an opening substantially configured at an angle of between approximately 5° and 55° and preferably comprising a width of between approximately 0.1 cm and 0.4 cm. In the current design of one presently preferred embodiment, the first pair of elongated channels 32 is preferably formed having an opening configured at an angle of approximately 30°. Preferably formed at a distance of between approximately 0.8 cm and 4.5 cm from the midsection 19 of the drag reduction member 12 and on opposing sides 20a, 20b thereof is a second pair of elongated channels 34a, 34b having an opening substantially configured at an angle of between approximately 50° and 120° and preferably comprising a width of between approximately 0.3 cm and 0.8 cm. In the current design of one presently preferred embodiment, the second pair of elongated channels 34a, 34b is preferably formed having an opening configured at an angle of approximately 85°.

Consistent with the foregoing disposition, dimensions, and/or angular configurations of the elongated channels 32, 34 of one presently preferred embodiment of the present invention, it will be readily appreciated by those skilled in the art that other suitable dispositions, dimensions, angular configurations, and/or numbers of elongated channels are possible which are consistent with the spirit and scope of the present invention. For example, the means for reducing drag 30 may include one or more elongated channels having an angular configuration of substantially 90°.

The varying dimensions and/or angular configurations of the means for reducing drag 30 which comprises two or more channels 32, 34 formed in the exterior surface 22 of the drag reduction member 12 are not critical to the invention as long as whatever dimensions and/or angular configurations are employed provide a reduction in drag. It is intended, therefore, that the example provided herein be viewed as exemplary of the principles of the present invention, and not as restrictive to a particular structure for implementing those principles.

In practice, when a solid body or substrate is substantially immersed within a fluid, the interaction of the forces acting on the surface facing of the solid body or substrate and those forces acting in motion relative thereto, generally create a hydrodynamic effect between the immersed solid body or substrate and the fluid therearound. Accordingly, the movement of the solid body or substrate within a fluid is sufficiently frustrated by the collision of fluid molecules (relative to the viscosity of the fluid) and the molecular composition of the solid body or substrate. Consistent therewith, the less surface area of the solid body or substrate which is immersed within the fluid will typically promote a better hydrodynamic flow of fluid across the surface facing of the solid body or substrate, thus creating less resistance to the movement of the solid body or substrate through the fluid.

In accordance with the foregoing, the performance of a moving watercraft substantially immersed within a body of water is related to the effect of the hydrodynamic forces and flow of water therearound. In this regard, the particular angular dimensions and/or width of elongated channels 32, 34 generally contribute to improving the hydrodynamic flow of water across at least a portion 64 of the surface facing 62 of the substrate 60 (e.g., the keel and/or bow of a watercraft) as the substrate moves through the water.

Referring now to FIG. 6, when a watercraft 60 moves through a body of water, a current of air generally impacts keel and/or bow 64 of the watercraft 60 and is preferably forced down through one or more elongated channels 32, 34 whereby creating a plurality of air pockets between the surface facing 62 of the hull 62 of the watercraft 60 and the water immersed therein. Consequently, these pockets of air provide a cushion of air that produces significant turbulence in the water whereby creating a hydroplane effect against the watercraft 60 as it moves through the water. In this manner, the pockets of air forced within the elongated channels 32, 34 generally provide means for lifting the watercraft 60 from the water, thus improving the hydrodynamic flow of water across the keel and/or bow 64 of the watercraft 60 and thereby sufficiently reduces the drag or suction forces acting against the watercraft 60.

Figure 7:
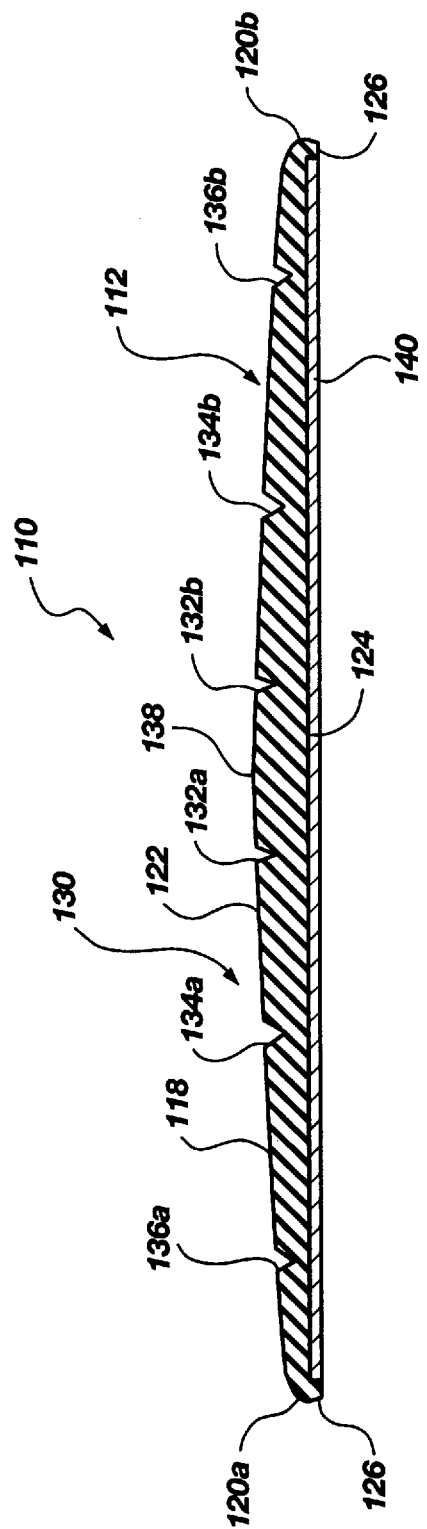
FIG. 7 is a cross-sectional view of an alternate embodiment of a drag reduction member of the apparatus for reducing drag over a flow surface of the present invention.

An alternate preferred embodiment of the present invention, as generally defined at 110, is illustrated in FIG. 7. As shown, the apparatus for reducing drag over a flow surface 110 includes a drag reduction member 112 comprising a means for reducing drag 130 of a fluid (e.g., liquid or gas) flowing over a substrate. The drag reduction member 112 preferably comprises an exterior surface 122 having two or more elongated channels 132, 134, 136 or complimentary pairs of elongated channels 132*a*, 132*b*, 134*a*, 134*b*, 136*a*, 136*b* formed therein and disposed parallel to the fluid flow and an opposing contacting surface 124 adapted to selectively cover at least a portion of a surface facing of the substrate. Structurally, each of the elongated channels 132, 134, 136 or complimentary pairs of elongated channels 132*a*, 132*b*, 134*a*, 134*b*, 136*a*, 136*b* is formed having an angular configuration selectively diverse dimensionally from the angular configurations of the other channels or pairs of channels.

The drag reduction member 112 preferably comprises a first end 114, a second opposing end 116, and an intermediate body portion 118 disposed therebetween. The intermediate body portion 118 is preferably formed having a general uniform thickness which tapers only slightly at the opposing sides 120*a*, 120*b* and the first and second ends 114, 116 of the drag reduction member 112, thus having no elongated internal channel or engageably disposed extension wings.

Preferably disposed in relation to at least a portion of the periphery of the contacting surface 124 of the drag reduction member 112 is a means for securing 140 the drag reduction member 112 to at least a portion of a surface facing of a substrate. As discussed above, the securing means 140 may comprise an inherent adhesive or use separate adhesive means for securing the contacting surface 124 to the substrate. Additionally, a protective lip 126 may be formed, if desired, along the outer periphery of the contacting surface 124 contiguous the opposing sides 120*a*, 120*b* and the first and second ends 114, 116 of the drag reduction member 112 to provide a means for protecting the securing means 140 from contact with water, oil, lubricants, hydraulic fluids, sand, gravel, rocks, and/or other objects or debris.

In one presently preferred embodiment of the present invention, an application guide 138 may be formed in relation to the drag reduction member 19 which is longitudinally disposed parallel to the disposition of the elongated channels 132, 134, 136. Preferably, the application guide 138 comprises an elongated linear imprint or impression formed in the exterior surface 122 of the drag reduction member 112. For example, the application guide 138 may be formed having a slightly darker coloration than the drag reduction member 112 so as to provide an indication of the approximate center of the drag reduction member 112 thereby providing assistance in the alignment and installation of the drag reduction member 112 over at least a portion of the surface facing of a substrate. As will be appreciated, other suitable configurations and/or means for indicating the approximate center of the drag reduction member 112 are possible. For example, a filament, wire, thread, or the like integrally disposed in relation to the midsection 19, a substantially "U" shaped linear conduit, a pen mark, or the like are possible. As disclosed above, the elongated opening 50 integrally formed in the body of the drag reduction member 12 of one presently preferred embodiment of the present invention may also provide a means for aligning the drag reduction member 12 over the portion of the surface facing of the substrate to which it is to be applied.

As shown in FIG. 7, three complimentary pairs of elongated channels 132*a*, 132*b*, 134*a*, 134*b*, 136*a*, 136*b* are longitudinally disposed parallel to the linear disposition of the intermediate body portion 118 at approximately the same distance on opposing sides 120*a*, 120*b* of the application guide 138. As shown, the elongated channels 132*a*, 132*b*, 134*a*, 134*b*, 136*a*, 136*b* may be configured having a substantially "U" or "V" shaped configuration. As will be readily appreciated by those skilled in the art, other geometrical shapes and/or configurations of the elongated channels 132, 134, 136 are possible and, therefore, intended to be contemplated herein.

A first pair of elongated channels 132*a*, 132*b* may be formed at a distance of between approximately 0.2 cm and 2.0 cm from the application guide 138 formed in the drag reduction member 112 and on opposing sides 120*a*, 120*b* thereof. Preferably, the first pair of elongated channels 132*a*, 132*b* may be formed having an opening substantially configured at an angle of between approximately 5° and 55° and preferably comprising a width of between approximately 0.1 cm and 0.4 cm. In the current of one presently preferred embodiment of the present invention, the first pair of elongated channels 132 is preferably formed having an opening configured at an angle of approximately 30°.

Preferably formed at a distance of between approximately 0.8 cm and 4.5 cm from the application guide 138 of the drag reduction member 112 and on opposing sides 120*a*, 120*b* thereof is a second pair of elongated channels 134*a*, 134*b* having an opening substantially configured at an angle of between approximately 50° and 120° and preferably comprising a width of between approximately 0.3 cm and 0.8 cm. In the current design of one presently preferred embodiment of the present invention, the second pair of elongated channels 134*a*, 134*b* is preferably formed having an opening configured at an angle of approximately 85°.

In addition, preferably formed at a distance between approximately 2.5 cm and 6.0 cm from the application guide 138 of the drag reduction member 112 and on opposing sides 120*a*, 120*b* thereof is a third pair of elongated channels 138*a*, 138*b* having an opening substantially configured with an angle of between approximately 60° and 160° and preferably comprising a width of between approximately 0.2 cm and 0.7 cm. In the current design of one presently preferred embodiment of the present invention, the third pair of elongated channels 136*a*, 136*b* is preferably formed having an opening configured at an angle of approximately 110°.

Consistent with the foregoing disposition, dimensions, and/or angular configurations of the elongated channels 132, 134, 136 of one presently preferred alternate embodiment of the present invention, it will be readily appreciated by those skilled in the art that other suitable dispositions, dimensions, angular configurations, and/or numbers of elongated channels are possible which are consistent with the spirit and scope of the present invention. For example, one or more elongated channels having an angular configuration of substantially 90° may be provided.

The varying dimensions and/or angular configurations of the channels 132, 134, 136 formed in the exterior surface 122 of the drag reduction member 112 are not considered to be critical to the invention as long as whatever dimensions and/or angular configurations are employed provide a reduction in drag. It is intended, therefore, that the example provided herein be viewed as exemplary of the principles of the present invention, and not as restrictive to a particular structure for implementing those principles.

From the above discussion, it will be appreciated that the present invention provides an apparatus for reducing drag over a flow surface of a substrate and methods for using same. In preferred construction, the present invention provides an apparatus for reducing drag over a flow surface comprising a drag reduction member being inherently conformable so as to provide universal application over various designs and/or configurations of a substrate or moving body, such as, for example, an airplane wing, automobile, airfoil, rudder, or the like and, more particularly, the keel and/or bow of a watercraft. Similarly, the drag reduction member of the present invention is formed of a material capable of providing sufficient rigidity so as to withstand abrasive damage to the portion of the surface facing of the substrate covered by the drag reduction member and, more particularly, to protect the keel and/or bow of a watercraft from abrasive damage caused by sand, gravel, rocks, and other obscure objects or debris found in water.

Unlike prior art drag reduction devices, the present invention provides an apparatus for reducing drag over a flow surface which comprises at least two elongated channels formed in the exterior surface of the drag reduction member parallel the flow of fluid (e.g., liquid or gas), wherein a first elongated channel may be formed having an angular configuration selectively diverse dimensionally from an angular configuration of a second elongated channel. Further, the present invention may comprise a sealable elongated channel that provides a means for cushioning impact forces and enhances flexibility upon application or installation of the drag reduction member over at least a portion of the surface facing of a substrate. Moreover, an apparatus for reducing drag over a flow surface of the present invention comprises a protective lip having a dimensional thickness and rigidity sufficient to provide a means for protecting a securing means from contact with fluid (air, water, oil, lubricants, hydraulic fluids, sand, gravel, rocks, and/or other object or debris) which may reduce the securing properties of the securing means.

Additionally, the present invention provides an apparatus and methods for reducing drag over a flow surface which does not require two or more technicians having special knowledge, skills, and/or tools to properly install the present invention over at least a portion of a surface facing of a substrate or moving body, such as, for example, an airplane wing, automobile, airfoil, rudder, or the like and, more particularly, the keel and/or bow of a watercraft. Moreover, the present invention provides an apparatus and methods for reducing the drag over a flow surface of a substrate which are capable of reducing the cost of repair and maintenance of the substrate (e.g., the keel and/or bow of a watercraft).

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An article capable of reducing resistance to drag of a fluid flowing over a surface facing of a substrate, said article comprising:

a drag reduction member comprising a substantially conformable material adapted to cover at least a portion of said surface facing of said substrate, said drag reduction member having an exterior surface and an opposing contacting surface;

means for securing at least a portion of said contacting surface of said drag reduction member over said portion of said surface facing of said substrate;

said drag reduction member comprising a protective lip sufficient for protecting said securing means from contact with foreign substances; and means for reducing drag of said fluid over said portion of said surface facing of said substrate, said drag reducing means comprising at least two elongated channels formed in said exterior surface of said drag reduction member, said first elongated channel having an angular configuration selectively diverse from said second elongated channel.

2. An article capable of reducing resistance to drag of a fluid flowing over a surface facing of a substrate as defined in claim 1 wherein said substrate is selected from a group consisting of a watercraft, an airplane, an automobile, and an airfoil.

3. An article capable of reducing resistance to drag of a fluid flowing over a surface facing of a substrate as defined in claim 1 wherein said drag reduction member comprises a first end, a second end, and an intermediate body portion disposed therebetween.

4. An article capable of reducing resistance to drag of a fluid flowing over a surface facing of a substrate as defined in claim 3 wherein said intermediate body portion comprises a cross-sectional thickness at a midsection which begins to dimensionally taper in width contiguous opposing sides of said intermediate body portion and said first and second ends of said drag reduction member.

5. An article capable of reducing resistance to drag of a fluid flowing over a surface facing of a substrate as defined in claim 3 wherein said intermediate body portion comprises a general uniform thickness.

6. An article capable of reducing resistance to drag of a fluid flowing over a surface facing of a substrate as defined in claim 1 wherein said securing means comprises an adhesive.

7. An article capable of reducing resistance to drag of a fluid flowing over a surface facing of a substrate as defined in claim 1 wherein said means for reducing drag comprises a first pair of elongated channels and a second pair of elongated channels, said first pair of elongated channels having an angular configuration selectively diverse from said second pair of elongated channels.

8. An article capable of reducing resistance to drag of a fluid flowing over a surface facing of a substrate as defined in 1 wherein said drag reduction member further comprises an opening having an internal surface area and a seal assembly for sealing said opening.

9. An article capable of reducing resistance to drag of a fluid flowing over a surface facing of a substrate as defined in claim 8 wherein said seal assembly includes at least two extension wings formed in closeable relation to said internal surface area of said opening of said drag reduction member.

10. An article capable of reducing resistance to drag of a fluid flowing over a surface facing of a substrate as defined in claim 1 wherein said drag reduction member is formed of a material that is sufficiently sturdy to withstand stress without permanent deformation.

11. An article capable of reducing resistance to drag of a fluid flowing over a surface facing of a substrate, said article comprising:

a drag reduction member comprising a substantially conformable material adapted to cover at least a portion of said surface facing of said substrate, said drag reduction member having an exterior surface and an opposing contacting surface;

means for securing said contacting surface of said drag reduction member over said portion of said surface facing of said substrate, said securing means comprising an adhesive disposed in relation to at least a portion of said contacting surface of said drag reduction member;

said drag reduction member comprising a protective lip having a dimensional periphery sufficient for protecting said securing means from contact with foreign substances;

a first complimentary pair of elongated channels, wherein each of said elongated channels comprises an angular opening for reducing drag of said fluid flowing over said portion of said surface facing of said substrate; and a second complimentary pair of elongated channels, wherein each of said elongated channels comprises an angular opening for reducing drag of said fluid flowing over said portion of said surface facing of said substrate, said angular opening of said first pair of elongated channels being selectively diverse from said angular opening.

12. An article capable of reducing resistance to drag of a fluid flowing over a surface facing of a substrate as defined in claim 11 wherein said substrate is selected from a group consisting of a watercraft, an airplane, an automobile, and an airfoil.

13. An article capable of reducing resistance to drag of a fluid flowing over a surface facing of a substrate as defined in claim 11 wherein said drag reduction member comprises a first end, a second end, and an intermediate body portion disposed therebetween, said intermediate body portion comprising a cross-sectional thickness at a midsection which begins to dimensionally taper in width contiguous opposing sides of said intermediate body portion and said first and second ends of said drag reduction member.

14. An article capable of reducing resistance to drag of a fluid flowing over a surface facing of a substrate as defined in claim 13 wherein said midsection comprises a cross-sectional thickness of approximately 0.5 cm.

15. An article capable of reducing resistance to drag of a fluid flowing over a surface facing of a substrate as defined in claim 13 wherein said opposing sides of said drag reduction member comprise a cross-sectional thickness of approximately 0.16 cm.

16. An article capable of reducing resistance to drag of a fluid flowing over a surface facing of a substrate as defined in claim 11 wherein said drag reduction member comprises an intermediate body portion having a general uniform thickness.

17. An article capable of reducing resistance to drag of a fluid flowing over a surface facing of a substrate as defined in 11 wherein said drag reduction member comprises an opening having an internal surface area and means for sealing said opening, said sealing means selectively disposed in closeable relation to said internal surface area.

18. An article capable of reducing resistance to drag of a fluid flowing over a surface facing of a substrate as defined in claim 17 wherein said seal assembly comprises at least two extension wings disposed on opposing sides of said opening.

19. An article capable of reducing resistance to drag of a fluid flowing over a surface facing of a substrate as defined in claim 11 wherein each channel of said first pair of elongated channels comprises an angular opening between approximately 5° and 55°.

20. An article capable of reducing resistance to drag of a fluid flowing over a surface facing of a substrate as defined in claim 11 wherein each channel of said second pair of elongated channels comprises an angular opening between approximately 50° and 120°.

21. An article capable of reducing resistance to drag of a fluid flowing over a surface facing of a substrate as defined in claim 11 further comprising a third pair of elongated channels.

22. An article capable of reducing resistance to drag of a fluid flowing over a surface facing of a substrate as defined in claim 21 wherein each channel of said third pair of elongated channels comprises an angular opening between approximately 60° and 160°.

23. An article capable of reducing resistance to drag of a fluid flowing over a surface facing of a substrate as defined in claim 11 wherein said drag reduction member is formed of a material that is sufficiently sturdy to withstand stress without permanent deformation.

* * * * *